United States Patent
Taylor et al.

(10) Patent No.: US 6,821,355 B1
(45) Date of Patent: Nov. 23, 2004

(54) AUTOMATIC EYEWEAR CLEANER

(75) Inventors: Charles E. Taylor, Punta Gorda, FL (US); Andrew J. Parker, Novato, CA (US); Edward C. McKinney, Jr., Novato, CA (US); Sik-Leung Chan, Hong Kong (CN); John S. Efroymson, Sylvania, OH (US)

(73) Assignee: Sharper Image Corporation, San Francisco, CA (US)

( * ) Notice: Subject to any disclaimer, the term of this patent is extended or adjusted under 35 U.S.C. 154(b) by 0 days.

(21) Appl. No.: 10/761,839

(22) Filed: Jan. 21, 2004

Related U.S. Application Data

(60) Provisional application No. 60/490,671, filed on Jul. 29, 2003.

(51) Int. Cl.$^7$ ............................................. B08B 1/02
(52) U.S. Cl. ............................... 134/32; 134/1; 134/2; 134/18; 134/34; 134/42; 134/901; 510/112
(58) Field of Search ............................ 134/1, 2, 18, 32, 134/34, 42, 901; 510/112

(56) References Cited

U.S. PATENT DOCUMENTS

| | | | |
|---|---|---|---|
| 4,114,194 A | | 9/1978 | Walter ........................ 366/111 |
| 4,597,399 A | * | 7/1986 | Rabenau et al. ............ 134/184 |
| 5,335,394 A | * | 8/1994 | Cunningham et al. ........ 15/302 |
| 5,534,741 A | | 7/1996 | Smith ......................... 310/317 |
| 5,794,635 A | * | 8/1998 | Maines ....................... 134/95.3 |
| 5,857,475 A | * | 1/1999 | Volk ........................... 134/153 |
| 5,890,503 A | * | 4/1999 | Bowen ..................... 134/102.3 |
| 5,979,849 A | * | 11/1999 | Williams ................. 248/309.1 |
| 5,988,910 A | | 11/1999 | Yahav ........................ 401/10 |
| 6,338,350 B1 | * | 1/2002 | Ewen ....................... 134/56 R |
| 6,355,104 B1 | * | 3/2002 | Polster ....................... 118/666 |
| 2003/0201004 A1 | * | 10/2003 | Cooley ........................ 134/195 |

OTHER PUBLICATIONS

The Sharper Image Catalog, p. 57, Ultrasonic Jewelry Cleaner, Holiday Gift Catalog 2003. The Ultrasonic Jewelry Cleaner sold in Dec. 2002.

* cited by examiner

*Primary Examiner*—Sharidan Carrillo
(74) *Attorney, Agent, or Firm*—Fliesler Meyer LLP

(57) ABSTRACT

An automatic eyeglass cleaner is provided in accordance with the invention. A specially formulated cleaning and conditioning solution is also provided for use with the automatic cleaner. A tank in the automatic cleaner is filled with the cleaning and conditioning solution; the eyewear is folded up and clipped to the bottom of the open lid of the cleaner, then the lid is closed to lower the eyewear into the solution. The cleaning cycle starts with the push of a button and the eyewear is agitated in the solution. The cleaning cycle stops automatically after a pre-set time, the lid pops up and any excess solution is shaken off the eyewear by the cleaner leaving a thin film on the lenses. A microfiber cloth is used to give the lenses a final touch-up that helps fill in microscopic scratches.

27 Claims, 8 Drawing Sheets

AUTOMATIC EYEWEAR CLEANER

This application claims priority to the following U.S. Provisional Application No. 60/490,671, filed Jul. 29, 2003 entitled "Automatic Eyewear Cleaner".

FIELD OF THE INVENTION

The present invention is directed to a system and method for cleaning eyewear.

BACKGROUND OF THE INVENTION

Whether they are for vision correction, vision protection or simply used as a fashion accessory, eyewear has long been a popular, if not indispensable, personal accessory. There are specialty eyewear which includes a wide range of eyeglasses and sunglasses that are designed for a specific purpose, such as computer use, driving, work, hobbies, eye protection and more. A huge variety of frames are available for prescription eyeglasses or sunglasses. Not only are there many different shapes and colors in eyeglass frames, but advances in technology have also brought a variety of new materials, for both the frames and the lens, which makes eyeglasses more durable, lightweight and comfortable. Eyeglass frames are now created from high-tech materials such as titanium and memory metals, while the lens are now thinner and lighter than ever before, even for high prescriptions. Lens coatings, including scratch-resistant coatings, ultraviolet treatments, anti-reflective coatings and mirror coatings, are commonly added to the lens to enhance their performance and appearance.

These high-tech frames and coated lens are expensive and are worth protecting. Unfortunately, the lens (even scratch-resistant coatings are not scratch-proof) can easily be damaged by casual cleanings by the wearer, leaving the lens with a unsightly scratched surface that can hinder vision. As any eyewear user knows, eyewear can require cleaning with just a short time of wear. Because of the eyewear's close contact to the wearer, body oils, sweat, grime and dead skin cells gets trapped in the lens and frame and accumulate in little time. Dust, dirt and fingerprints on the lens add to this unwanted mess. Further, the metal finish of frames can corrode and become discolored from prolonged exposure to sweat, which is acidic in nature.

Wiping the eyewear with tissue paper or the corner of a shirt is a common practice for many eyeglass wearers. However, ordinary tissue paper and many types of cloths are highly abrasive because of their coarse fibers. Wiping the lens with these often lead to irreparable damage to the coating. Small, hard particles such as sand may also be deposited on the lens, and a simple wiping may be akin to polishing the lens with sandpaper.

Non-abrasive Micro-fiber Towels, with each strand of fiber being made of hundreds of micro-fibers (on the scale of 90,000 micro-fibers per sq. inch) have been gaining popularity in eyeglass care. These micro-fibers act to attract and hold dirt and grime, and can retain up to seven times its weight. The cloth used in micro-fiber towels is made of a matrix of polyester and polyamide weaved in such a way as to create a "clinginess" that picks up dirt. However, these towels are unable to reach tiny nooks and crannies of the eyeglass frame, and do not counteract the acidic corrosion of sweat. Further, because the cloths trap and hold grime, they get dirty very quickly and lose their effectiveness without frequent laundering.

Ultrasonic cleaners, such as the one taught in U.S. Pat. No. 4,114,194, have long been known in the field of professional jewelers and optometrists. The ability of a liquid when ultrasonically agitated to penetrate small spaces and, by cavitation, to remove foreign matter from solid objects has led to the wide use of ultrasonic cleaners in laboratories and industry. However, it is discovered that the use of ultrasonics tends to break down and remove the coating on the lens.

U.S. Pat. No. 5,988,910 teaches an eyeglass cleaning apparatus with a pair of lens engaging rollers made of soft web material mounted on a handle. A lens is passed between the rollers and the rollers are rotated to clean the lens simultaneous on both sides. The handle includes a pump for spraying cleaning solution on the lens prior to operation. This device cleans only one lens at a time, and requires constant movement by the user to cover all corners of a lens. Further, it is not designed specifically with cleaning the frame in mind.

SUMMARY OF THE INVENTION

An automatic, motorized eyewear cleaner is provided in accordance with an embodiment of the invention. The cleaner can clean practically any pair of eyeglasses by agitating them in a specially formulated cleaning solution, and then automatically drying them. The entire process from start to finish should take only about one minute.

It is, therefore, an object of this invention to provide an automatic device that can effectively and safely clean all manner of eyewear, regardless of whether the frame is plastic or metal, whether the lens are glass or plastic, or whether the lenses are coated or not. The device should be able to clean most shapes and sizes of frames and lens.

It is a related object of this invention to provide an automatic device that is small and compact, yet can receive and clean virtually all available eyewear.

It is a related object of this invention to provide a specially formulated solution for use in conjunction with the automatic device that is safe to materials and coatings used in eyewear that would dissolve dirt and grime on the eyewear and leave a chemical coat that fills in micro-scratches on the lens.

A further object is to have this chemical coat be anti-static to act as a repellent to dust particles.

A related object is to have the solution make the eyewear feel cool and refreshing to the wearer when they are put on after cleaning.

Another related object is for the solution to counteract the effects of corrosion caused by sweat.

It is another object of this invention to provide an automatic device that can effectively clean eyewear in the specially formulated solution and then substantially dry the eyewear, in sixty seconds or less.

It is a further object of the invention to provide an automatic device that is easy to operate and to maintain.

A related object of the invention to provide a device that is economical to operate, even with frequent use.

Another object of the invention is to provide a pleasing display of lights while the eyeglass is being cleaned.

The above and related objects are addressed by embodiments of the instant invention. In the following discussion, the terms eyeglasses, eyewear, glasses will have the same meaning, and refer to a common configuration comprising a frame, lens, nose rests, hinges, and ear pieces.

DETAILED DESCRIPTION OF THE INVENTION

An automatic eyeglass cleaner is provided in accordance with an embodiment of the invention. A specially formulated cleaning and conditioning solution is also provided for use with the automatic cleaner. A tank in the automatic cleaner is filled with the cleaning and conditioning solution; the eyewear is folded up and clipped to the bottom of the open lid of the cleaner, then the lid is closed to lower the eyewear into the solution. The cleaning cycle starts with the push of a button and the eyewear is agitated in the solution. The cleaning cycle stops automatically after a pre-set time, the lid pops up and any excess solution is shaken off the eyewear by the cleaner leaving a thin film on the lenses. A microfiber cloth is used to polish the lenses a quick final touch-up that helps fill in microscopic scratches. The whole process from start to finish should take only about one minute.

Figure 1:
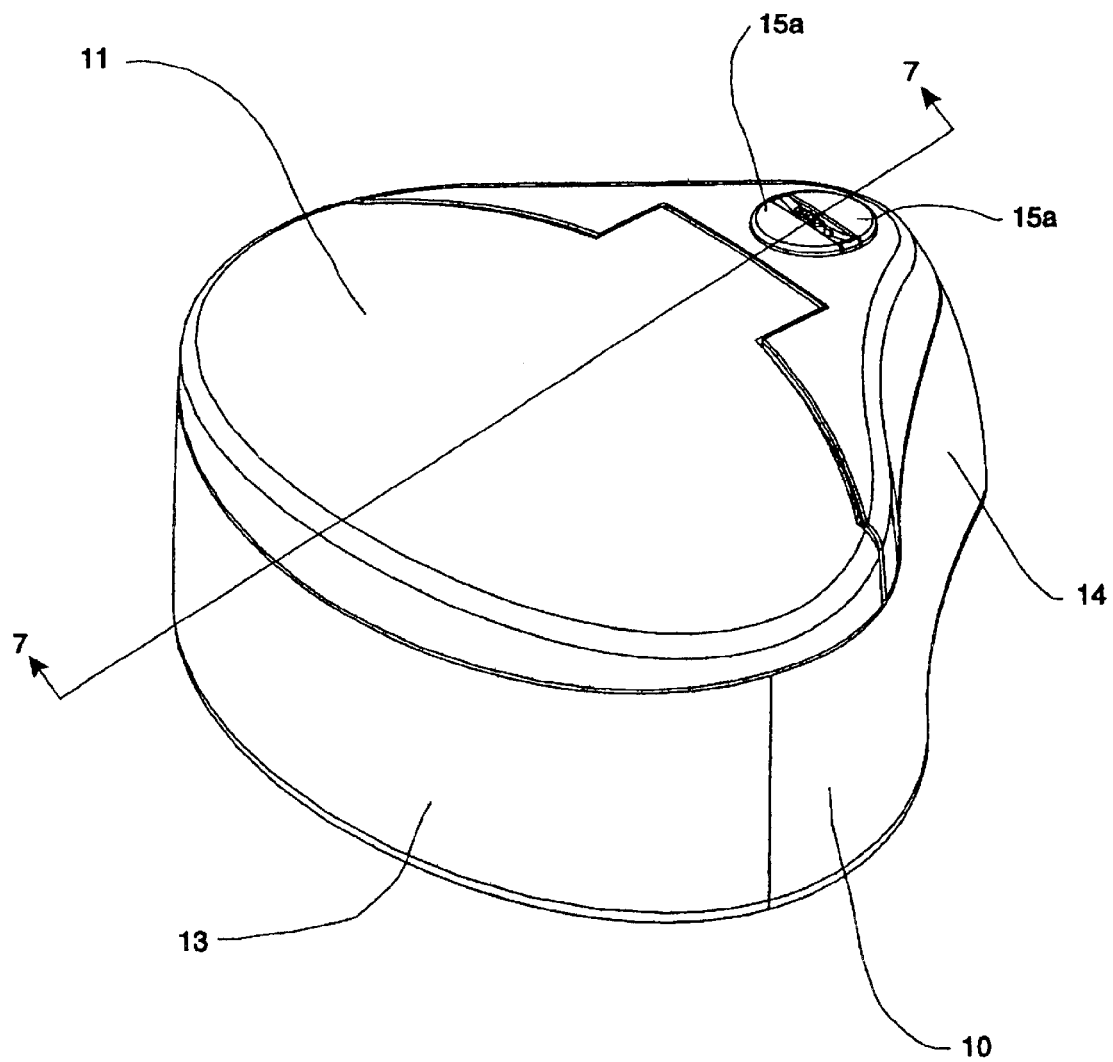
FIG. 1 shows a perspective view of an embodiment of an exterior of an automatic eyewear cleaner according to the invention.

In FIG. 1, the exterior of an automatic eyewear cleaner ("cleaner") 10 is shown. In the illustrated embodiment, the cleaner 10 has a generally oval configuration. However, any configuration, which is pleasing in appearance, would be suitable. The cleaner has a lid 11 which pivotally opens upwards. The lid 11 covers the removable solution tank 13 into which the cleaning and conditioning solution is filled. In the embodiment shown, the tank fits in the general profile of the cleaner when installed. The tank is made to be removable from the cleaner for easy cleaning and disposal of spent cleaning solution. The housing of the cleaner 14 houses the electronics and motor, and has operating controls 15. The controls shown, in the form of buttons 15a and 15b, opens the lid, and turns the cleaner on and off.

Figure 2:
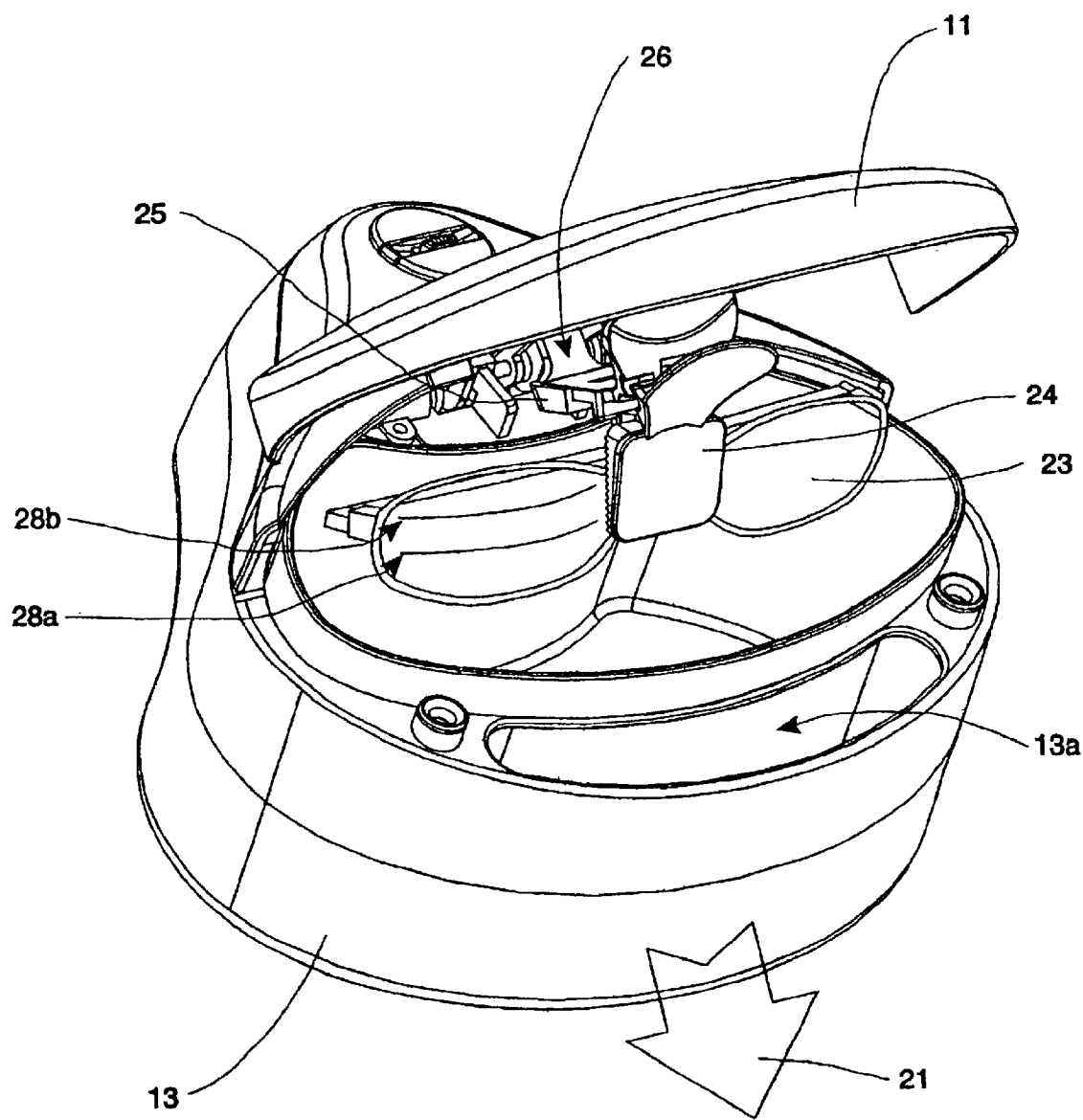
FIG. 2 shows a perspective view of an embodiment of the invention, from a different angle, with a lid open and showing the removable tank underneath, with a pair of eyewear attached.

FIG. 2 shows the cleaner, from a different angle, with its lid 11 open and showing the removable tank 13 underneath. The tank slides out in the direction of arrow 21. A small storage compartment 13a can be made integral with the tank. An exemplary pair of eyeglasses 23 is shown in this diagram. A removable holder clip 24 for clipping the eyeglasses 23 is removeably attached to a receptacle 25 on an agitator arm 26. The lid, shown here in its open configuration, should become (and remain) fully open at an angle sufficient for easy attachment and detachment of the clip and eyeglasses, with the tank filled and attached to the cleaner. The lid should remain open even with the full weight of the clip and eyeglasses attached to it, until the user presses down on the lid to close it. During the drying cycle, the lid opens, and raises the glasses above the solution, until the user is ready to retrieve them. The lid opening and closing mechanism and the agitator arm is described further below.

Figure 8:
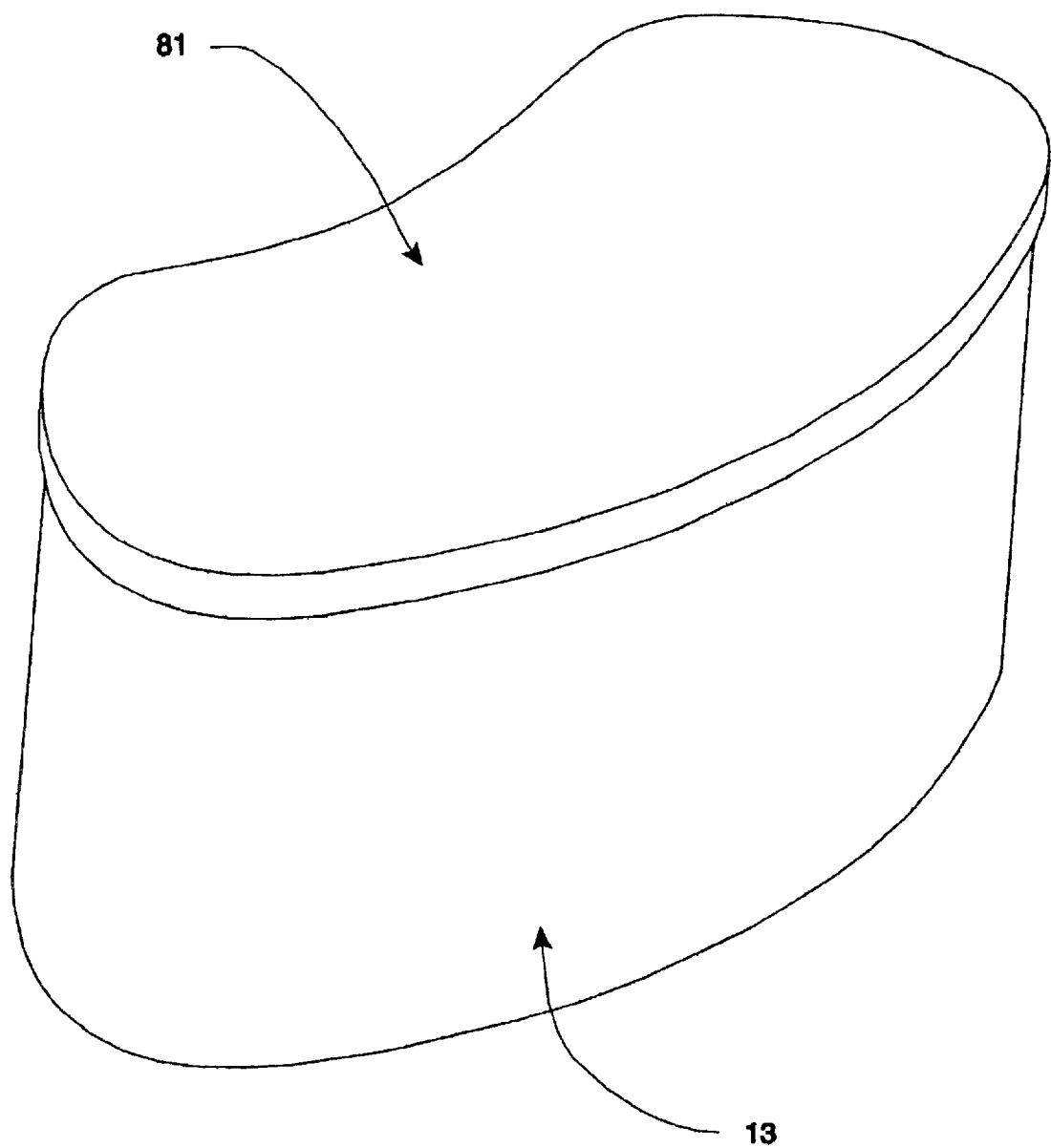
FIG. 8 is a perspective view of a cover for a solution tank of an embodiment of the invention.

Fill lines on the tank show a recommended minimum fill level and maximum fill level the solution should be filled to. A minimum level 28a is set so that the solution will cover the entire eyeglasses when the lid is closed to lower the eyeglasses into the solution tank. The maximum fill level 28b shows the maximum amount of solution that should be filled, in order to avoid spillage and splattering when the device is in operation and when the filled solution tank is removed for disposal of spent solution. A cover 81 (see FIG. 8) can also be used to seal the tank so the solution would not spill during transportation to and from a sink.

Figure 3A:
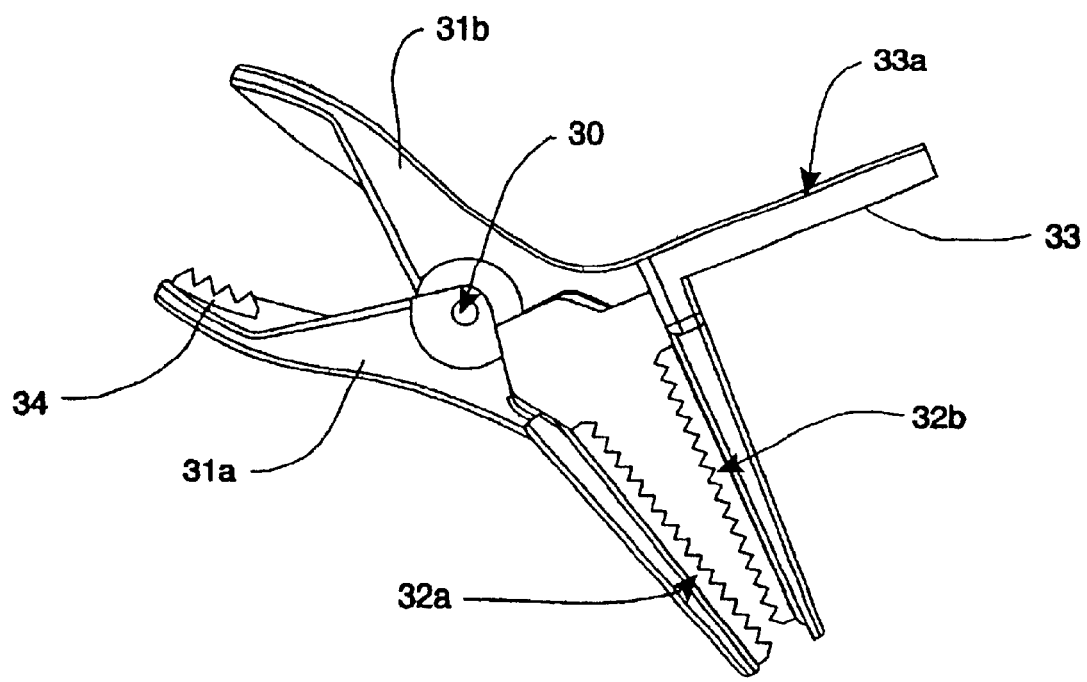
FIGS. 3a and 3b show side views of a removable holding clip of an embodiment of the invention in open and closed positions respectively.
Figure 3B:
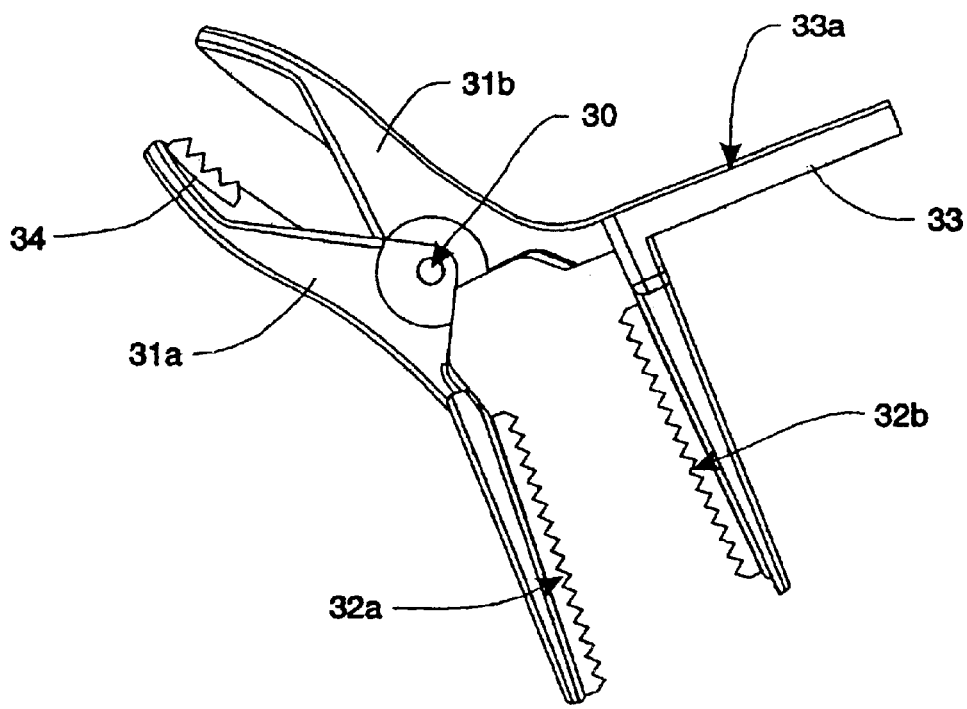

In FIG. 3a, a removable holding clip is shown in its closed configuration. The clip is ordinarily held shut by a spring 30, and opens when pressure is applied to the handles 31a, 31b. When in the open position shown in FIG. 3b, the clip can receive a pair of eyeglasses by positioning the clip over the nose bridge of a folded pair of eyeglasses. When pressure is removed, the clips close and hold the eyeglasses through retention means, such as rows of rubber teeth shown as 32a and 32b. The clip has a finger grip area 34 on the lower handle 31a to facilitate easy loading and unloading of the clip into the cleaner without applying pressure to both handles, which would open the clip and release the glasses.

In a preferred embodiment of the invention, a magnet and metal combination is used to attach the clip (and the glasses held by the clip) to the receptacle on the agitator arm to allow for easy placement of the eyeglasses into the cleaner. A magnet or metal piece 33a is made integral with an attachment part 33 on the clip, with a corresponding magnet or metal piece on a receptacle integral with the agitator arm. The clip will be magnetically drawn to the receptacle when in proximity to it, and the shape of the receptacle, which matches the attachment means on the clip, will ensure a secure fit. The magnet should be of sufficient strength to hold the clip loaded with eyeglasses throughout the cleaning and drying cycles, until the user removes the clip by simply pulling on it to disengage the magnet.

Figure 4:
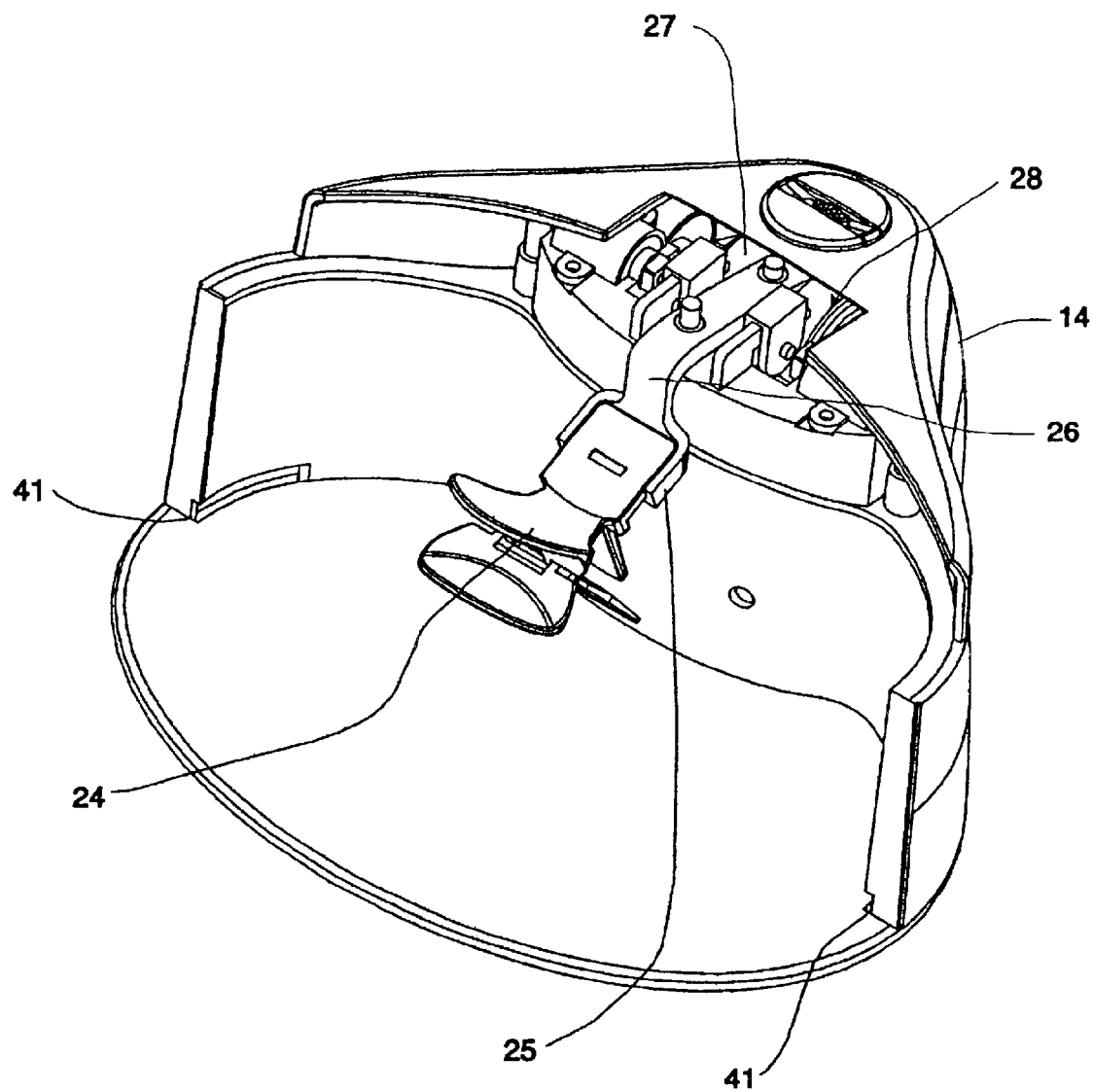
FIG. 4 shows a perspective view of the cleaner of an embodiment of the invention, with a solution tank removed.

FIG. 4 shows a front view of the cleaner, with the solution tank removed and the cleaner lid not shown. Slots 41 slidably receive matching parts on the tank to ensure the tank is properly seated when loaded into the cleaner. The clip 24 is shown magnetically secured to the receptacle 25. The receptacle is integral with the agitator arm 26, which extends into the cleaner housing 14 and forms a motor housing 27 for the motor 28 (described in detail below).

Figure 5:
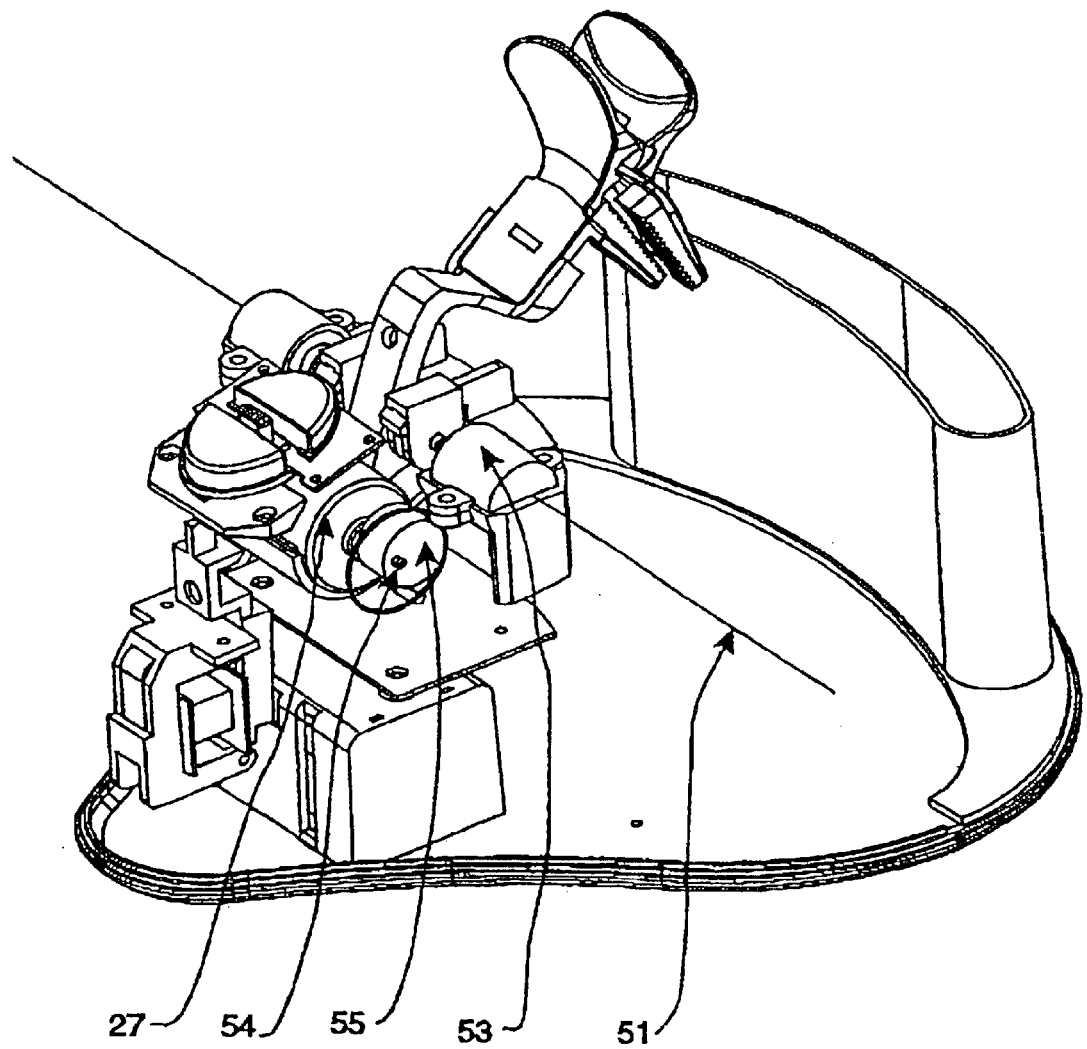
FIG. 5 shows a cut-away perspective view of the cleaner of an embodiment of the invention from the back of the unit.

FIG. 5 shows a cut-away view of the cleaner housing from the back. The arm is aligned but not connected to the cleaner lid, with both being pivotally mounted along the same axis, 51. The arm is designed to be separate from the lid so that when the lid is closed and the agitator arm is vibrated to agitate the eyeglasses in solution, the vibrations passing directly to the lid is minimized. The cleaner, thus, remains relatively stable on a flat surface as it is operated, because the vibrations from the agitation is kept internal to the cleaner.

Figure 6:
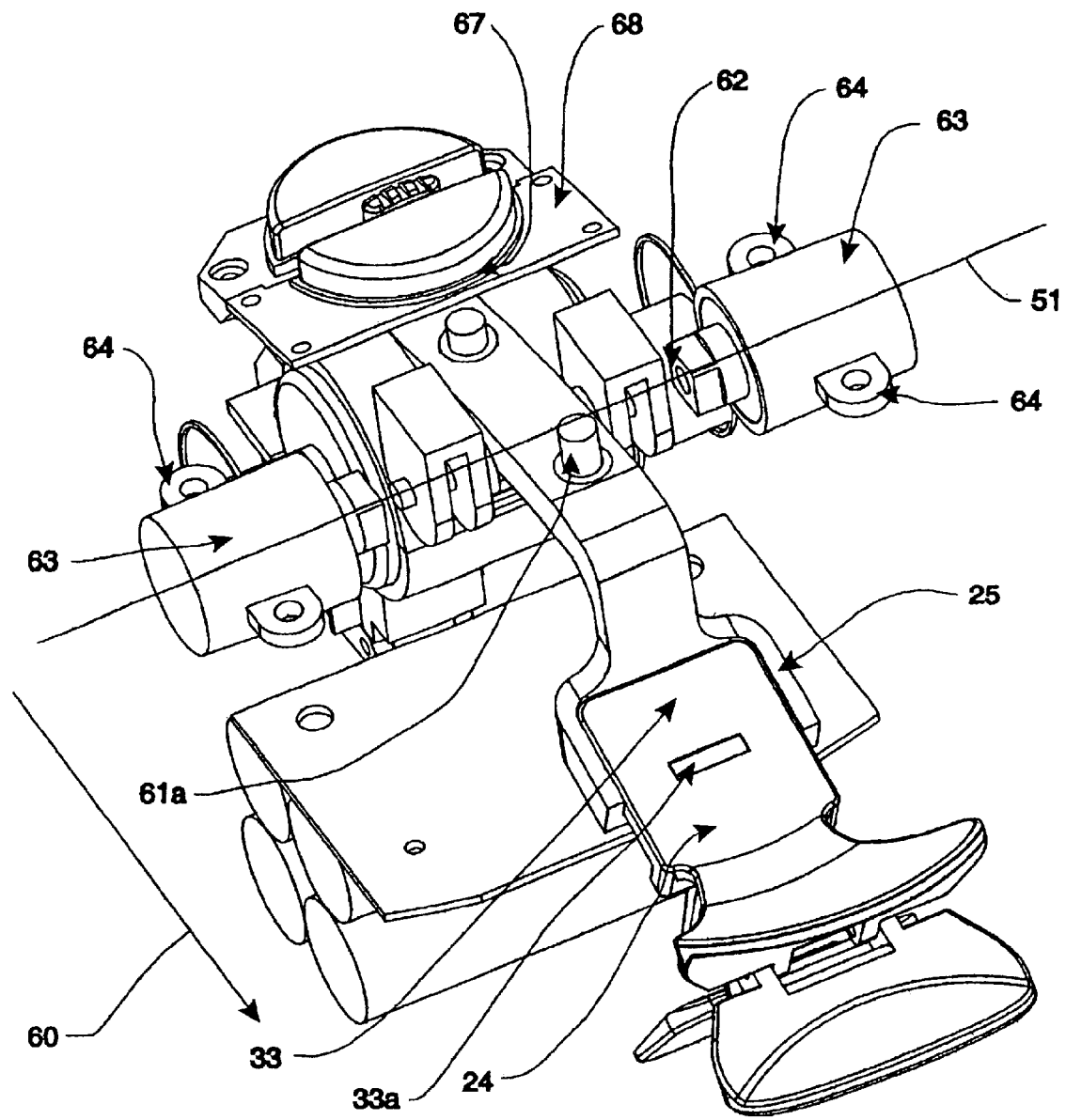
FIG. 6 shows a perspective isolation view of the mechanical parts of an embodiment of the invention.
Figure 7:
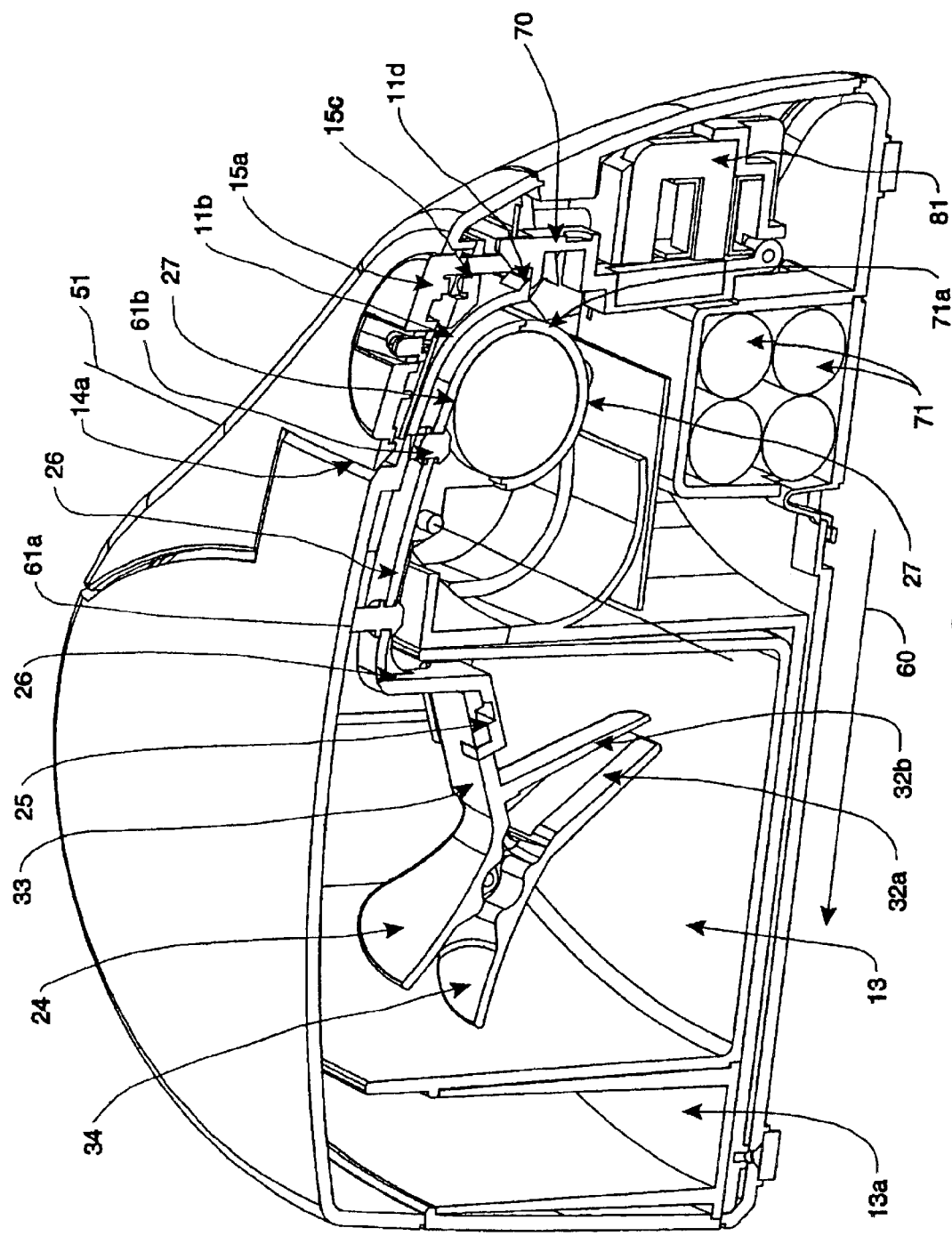
FIG. 7 shows a cross-section view of an embodiment of the invention taken through line 7—7 in FIG. 1.

Refer now to FIG. 6, which shows in isolation the mechanical parts of the cleaner, and FIG. 7, which shows a cross-section of the unit. Direction arrow 60 in both diagrams designate the front of the unit. The cleaner lid 11 is pivotally mounted at 62 on two damper torsional springs 63, with the torsional springs secured with screws 64 onto the cleaner housing along axis 51 (see FIG. 6). The torsional springs exert tension to hold the lid in its open position. A part of the lid aft of the axis 51 extends inside the housing and forms a curved surface 11b, which slopes downwards. The lid pivots around axis 51 as the lid is raised and lowered, and the curved surface moves in opposite relationship with the front of the lid. When the front of the lid is pushed down to close the lid, the curved surface pivot upwards and its end clicks onto a spring-loaded catch 70 and the lid is held closed (see FIG. 7). A raised rubber divot 61a on the agitator arm, mounted forward of axis 51, pushes down on the arm as the lid is closed and lowers the clip and the eyeglasses (not shown) into the solution tank. Button 15a, which is depressed to open the lid, is integral with a push-rod 15 which extends downwards to come in contact with the catch.

Depressing button 15a pushes down on the rod, which would release the catch and allow curved surface 11c to pivot downwards (from the tension exerted by the damper torsional springs 62), thus raising the front of the lid. As the lid opens, it exerts pressure on raised rubber divot 61b on the agitator arm positioned aft of the axis 51, and raises the agitator arm to lift the eyewear out of the solution. In order to eliminate splatter as the eyewear is lifted, the damper torsional springs can be immersed in thick viscosity lubrication so that when the lid opens, it does so gradually.

As mentioned above, the agitator arm 26 extends into the cleaner housing 14 and is integral with a motor housing 27, which holds the motor 28. The motor housing and motor is positioned aft of axis 51. Refer to FIG. 5, when the agitator arm pivots around axis 51 as it is raised and lowered, the motor, being held by motor housing 27, moves in opposite relationship to the front receptacle end of the arm. Refer to FIG. 7, the motor, held by the motor housing, remains integral with the agitator arm at all times, whether the agitator arm is raised or lowered.

In a preferred embodiment, the motor is powered by common DC batteries 71 which are inserted into the cleaner housing 14 through a door on the bottom. Referring back to FIG. 5, the motor rotates a shaft 54 which extends out of the sides of the motor, and onto which weights 55 are eccentrically mounted on each side. When the motor is turned on, strong, rhythmic vibrations are produced by the weights rotating off-center at high speed. The vibrations are directly transferred through the motor housing and onto the agitator arm, including the front receptacle. When the clip and eyeglasses are loaded onto the receptacle, they are vibrated as well. In a preferred embodiment, the motor should operate at about 1300 rpm, which is well below ultrasonic range, but still sufficient to produce strong agitation when the eyeglasses are in the cleaning solution, and sufficient to substantially shake dry the eyeglasses when they are raised from the solution. In a preferred embodiment of the invention, during the cleaning and drying cycles just described, the motor continues to operate uninterrupted at the same speed, with the difference being whether the front of the agitator arm is lowered or raised.

Once the lid is closed to lower the eyeglasses into the solution tank, the user depresses button 15a to begin the automatic cleaning procedure. Referring back to FIG. 6, button 15a depresses an electrical contact 67 to activate electronic timing circuitry 67, turning on the motor. In an alternative embodiment, a mechanical or electromechanical timer can also be used. During the cleaning cycle, the motor operates for a preset amount of time and agitates the glasses in the solution. In a preferred embodiment, the cleaning cycles lasts about 40–50 seconds, which is sufficient time for the cleaning and condition solution to substantially dissolve and/or remove the dirt and grime from the frame and lens. At the expiration of this amount of time, the timing circuit begins the drying cycle and triggers an electromagnet 81 located in the housing, which attracts a metal piece 70a integral with the releasable catch 70. This pulls the catch backwards towards the electromagnet and releases the curved end 11b of the lid, and the front of the lid is raised due to the tension exerted by the torsion springs. As discussed previously, the agitator arm (and the clip with eyeglasses attached to it) is raised out of the solution by the opening lid. The lid pivots around axis 51 until the front of the lid is stopped by edge 14a, with the lid remaining in its fully open configuration and the glasses held above the solution tank. The agitator arm continues to vibrate in this raised position, and the wet eyeglass is shaken substantially dry. Solution dripping from the eyeglasses is collected by the solution tank and can be re-used in future cleanings. In a preferred embodiment, the drying cycle lasts about 10–20 seconds, after which the timing circuit turns the motor off. Note that from the beginning of the cleaning cycle to the end of the drying cycle, the motor remains running uninterrupted.

In another embodiment of the invention, the electronic timing circuitry can also control the timing of LCD or LED lights 45 (see FIG. 4) positioned in the housing behind the solution tank and shine through the solution to create a pleasing lightshow. In this embodiment, the cleaner should be made of a transparent or translucent material for the light to shine through.

In a preferred embodiment, the novel cleaning and conditioning solution for use with the automatic eyeglass cleaner described above is comprised of deionized water, Berol 226, Triethanolamine 99, Hydroxymethylglycinate, Isopropyl Alcohol, Sorbitan Mono-oleate, acid blue 9 and Polydimethylsiloxane Emulsion. See Table 1 for the percentage by weight of each ingredient in a preferred embodiment.

TABLE I

| INGREDIENT | PERCENT W/W |
|---|---|
| Deionized Water | 61.4 |
| Berol 226 (Akzo Nobel) | 7.5 |
| Triethanolamine 99 | 10.5 |
| Hydroxymethylglycinate | 3 |
| Isopropyl Alcohol | 2.5 |
| Sorbitan Mono-oleate | 5 |
| 1% Acid Blue 9 | 0.1 |
| Polydimethylsiloxane Emulsion | 10 |

Berol SA is a blend of a nonionic and cationic surfactant optimized for use in water based degreasing cleaners. It is efficient for cleaning organic soils, such as grease and oil. Triethanolamine 99% is formed from the reaction of ethylene oxide and ammonia. It is miscible with water and alcohol and makes the solution alkaline, and improved grease removal and the compatibility of the ingredients. A biocide, the aqueous solution of Sodium Hydroxymethylglycinate is derived from Glycine—a naturally occurring amino acid. It has broad pectrum antimicrobial activity and is effective against bacteria and fungi. Isopropyl Alcohol, also known as IPA, 2-propanol and isopropanol, is a colorless clear liquid with a pleasant odor. It is a good dehydrating agent and disinfectant. Sorbitan Mono-oleate is a light amber-color surfactant that is used as an nonionic lipophilic surface active agent. It is an emulsion stabilizer. The aqueous emulsion of polydimethylsiloxane is an anti-fogging agent and gives the eyewear a slick feel. It is a relatively inert, and is easy to dilute and disperse and is effective over a wide range of temperature and pH conditions. Acid Blue 9, also known as Brilliant Blue FCF, C.I. Acid Blue 9, diammonium salt, C.I. Acid Blue 9, and disodium salt, is a widely used food dye. It comes in a reddish-violet powder or granules with metallic luster.

The solution is manufactured by adding the above ingredients in the following order: deionized water, Berol 226, Triethanolamine 99, Hydroxymethylglycinate, Isopropyl Alcohol, Sorbitan Mono-oleate. The mixture is mixed until all the ingredients are dissolved and uniform. Next, 1% Acid Blue 9 is added to the solution and mixed. Polydimethylsiloxane emulsion is then added while the solution continues to be mixed, and the solution should be mixed for at least another fifteen (15) minutes to obtain the final solution in concentrate form having a pH of 9.2–10.2 and a specific gravity of 1.018–1.024 (gm/ml). The concentrate is to be diluted approximately 1:32 with ordinary tap water to obtain a cleaning solution for use in the cleaner.

The cleaning solution has the properties of being able to emulsify and dissolve body oils, dirt and grime deposited on the frame and lens. Further, the solution will form a thin film on surfaces it comes into contact with, especially the lens of the eyeglasses. This film can fill in micro-cracks and scratches on the surface of the lens and coating, and helps in restoring the surface of the lens.

After the drying cycle is complete, the frame and lens of the glasses should be substantially dry, with the thin film of silicone deposited on the lens. The user reaches into the open lid, and grabs the clip with his fingers. A simple pull will disengage the magnet holding the clip to the receptacle on the agitator arm, and the loaded clip is removed from the cleaner. The handles of the clip are depressed to release the eyeglasses. Finally, a micro-fiber cloth is used to briefly polish and dry the lens, a quick final touch-up that helps the silicon fill in microscopic scratches. The sparkling-clean glasses are now ready to wear.

It will be appreciated that the instant specification, drawings and claims set forth by way of illustration and not limitation, and that various modification and changes may be made without departing from the spirit and scope of the present invention. Additional aspects, objects and advantages of the invention can be obtained through a review of the appendant claims and figures. It is to be understood that other embodiments can be fabricated and come within the spirit and scope of the claims and the invention.

We claim:

1. A method of cleaning an eyeglass with a motorized cleaner, comprising the steps of:

clipping the eyeglass to a detachable clip;

attaching the clip to an agitator arm of the motorized cleaner;

lowering the agitator arm to lower the eyeglass and the agitator arm into a solution tank, the solution tank containing a cleaning solution;

operating the motorized cleaner to turn on a motor, the motor moving the agitator arm and the attached eyeglass repeatedly in a back and forth motion in the cleaning solution;

the motorized cleaner automatically raising the agitator arm and the attached eyeglass out of the cleaning solution and moving the eyeglass and the agitator arm repeatedly in a back and forth motion to substantially dry the eyeglass;

the motorized cleaner automatically turning off the motor; and removing the detachable clip from the agitator arm and removing the eyeglass from the clip.

2. The method of cleaning according to claim 1 further comprising the step of lowering a lid of the motorized cleaner to lower the agitator arm and the attached eyeglass into the solution tank.

3. The method of cleaning according to claim 1 further comprising the step of automatically raising a lid of the motorized cleaner to raise the agitator arm and the attached eyeglass out of the cleaning solution.

4. The method of cleaning according to claim 1 wherein the step of moving the agitator arm and the attached eyeglass in the repeated motion in the cleaning solution is performed for a predetermined amount of cleaning time.

5. The method of cleaning according to claim 1 wherein the step of raising the agitator arm and the attached eyeglass out of the cleaning solution is performed after a predetermined amount of cleaning time.

6. The method of cleaning according to claim 1 wherein the eyeglass is moved in the repeated motion out of the cleaning solution for a predetermined amount of drying time.

7. The method of cleaning according to claim 1 wherein the step of raising the agitator arm and the attached eyeglass out of the cleaning solution is performed gradually.

8. The method of cleaning according to claim 1 wherein the eyeglass is moved in the repeated motion while the motorized cleaner automatically raises the eyeglass out of the cleaning solution.

9. The method of cleaning according to claim 1 wherein the step of automatically turning off the motor is performed after a set amount of time.

10. The method of cleaning according to claim 1 further comprising the step of lowering a lid of the motorized cleaner after removing the detachable clip from the agitator arm, wherein the agitator arm is lowered as the lid is lowered.

11. The method of cleaning according to claim 1 wherein the step of moving the agitator arm in the cleaning solution further comprises vibrating the agitator arm.

12. The method of cleaning according to claim 1 wherein the step of operating the motorized cleaner is performed simultaneously with the step of raising the agitator arm from the solution tank.

13. The method of cleaning according to claim 1 wherein the step of moving the agitator arm and the eyeglass out of the cleaning solution further comprises vibrating the agitator arm and the eyeglass.

14. A method of cleaning an eyeglass utilizing a motorized cleaner comprising the steps of:

attaching an eyeglass to a clip;

attaching the clip to an agitator arm of the motorized cleaner;

placing the agitator arm and the eyeglass into a cleaning solution in the motorized cleaner;

cleaning the eyeglass by operating a motor to move the agitator arm and the eyeglass in a repeated back and forth motion in the cleaning solution for a predetermined time;

automatically removing the agitator arm and the eyeglass from the cleaning solution after the predetermined time;

moving the agitator arm repeatedly in a back and forth motion to substantially dry the eyeglass, and automatically turning off the motor to allow the eyeglass to be removed from the clip.

15. The method of cleaning according to claim 14 further comprising the step of lowering a lid of the motorized cleaner to lower the agitator arm and the attached eyeglass into the cleaning solution.

16. The method of cleaning according to claim 14 further comprising the step of automatically raising a lid of the motorized cleaner to raise the agitator arm and the eyeglass out of the cleaning solution.

17. The method of cleaning according to claim 14 wherein the eyeglass is moved in the repeated motion out of the cleaning solution for a predetermined amount of drying time.

18. The method of cleaning according to claim 14 wherein the step of removing the agitator arm and the attached eyeglass from the cleaning solution is performed gradually.

19. The method of cleaning according to claim 14 wherein the step of automatically turning off the motor is performed after a set amount of time.

20. A method of cleaning an eyeglass utilizing a motorized cleaner comprising the steps of:

lifting a lid of a motorized cleaner;

attaching an eyeglass to a clip in the motorized cleaner;

attaching the clip to an agitator arm of the motorized cleaner;

lowering the lid of the motorized cleaner to place the agitator arm and the eyeglass into a cleaning solution;

cleaning the eyeglass by operating a motor, wherein the motor moves the agitator arm in a repeated back and forth motion in the cleaning solution for a predetermined time;

automatically lifting the lid, wherein the agitator arm and the eyeglass is raised out of the cleaning solution after the predetermined time;

moving the agitator arm repeatedly in a back and forth motion to substantially dry the eyeglass, and automatically turning off the motor to allow the eyeglass to be removed from the clip.

21. The method of cleaning according to claim 20 wherein the eyeglass is moved in the repeated motion out of the cleaning solution for a predetermined amount of drying time.

22. The method of cleaning according to claim 20 wherein the step of lifting the lid to raise the agitator arm and the attached eyeglass out of the cleaning solution is performed gradually.

23. The method of cleaning according to claim 20 wherein the eyeglass is moved in the repeated motion while the eyeglass is raised out of the cleaning solution.

24. The method of cleaning according to claim 20 wherein the step of automatically turning off the motor is performed after a set amount of time.

25. The method of cleaning according to claim 20 wherein the step of operating the motor is performed simultaneously with the agitator arm being raised from the cleaning solution.

26. A method of cleaning an eyeglass with a motorized cleaner, comprising the steps of:

clipping the eyeglass to a clip;

attaching the clip to an agitator arm of the motorized cleaner;

lowering the agitator arm to lower the eyeglass and the agitator arm into a solution tank, the solution tank containing a cleaning solution;

operating a motor to lower the agitator arm and the eyeglass in the cleaning solution;

moving the agitator arm and the eyeglass repeatedly in a back and forth motion;

raising the agitator arm and the eyeglass out of the cleaning solution and simultaneously moving the eyeglass in the repeated back and forth motion to substantially dry the eyeglass;

automatically turning off the motor;

removing the clip from the agitator arm; and removing the eyeglass from the clip.

27. A method of cleaning an eyeglass with a motorized cleaner, comprising the steps of:

clipping the eyeglass to a detachable clip;

attaching the clip to an agitator arm of the motorized cleaner;

lowering the agitator arm to lower the eyeglass and the agitator arm into a solution tank, the solution tank containing a cleaning solution;

operating the motorized cleaner to turn on a motor, the motor vibrating the agitator arm and the attached eyeglass in the cleaning solution;

the motorized cleaner automatically raising the agitator arm and the attached eyeglass out of the cleaning solution and moving the eyeglass in a repeated back and forth motion to substantially dry the eyeglass;

the motorized cleaner turning off the motor; and removing the detachable clip from the agitator arm and removing the eyeglass from the clip.

\* \* \* \* \*